Patented June 19, 1928.

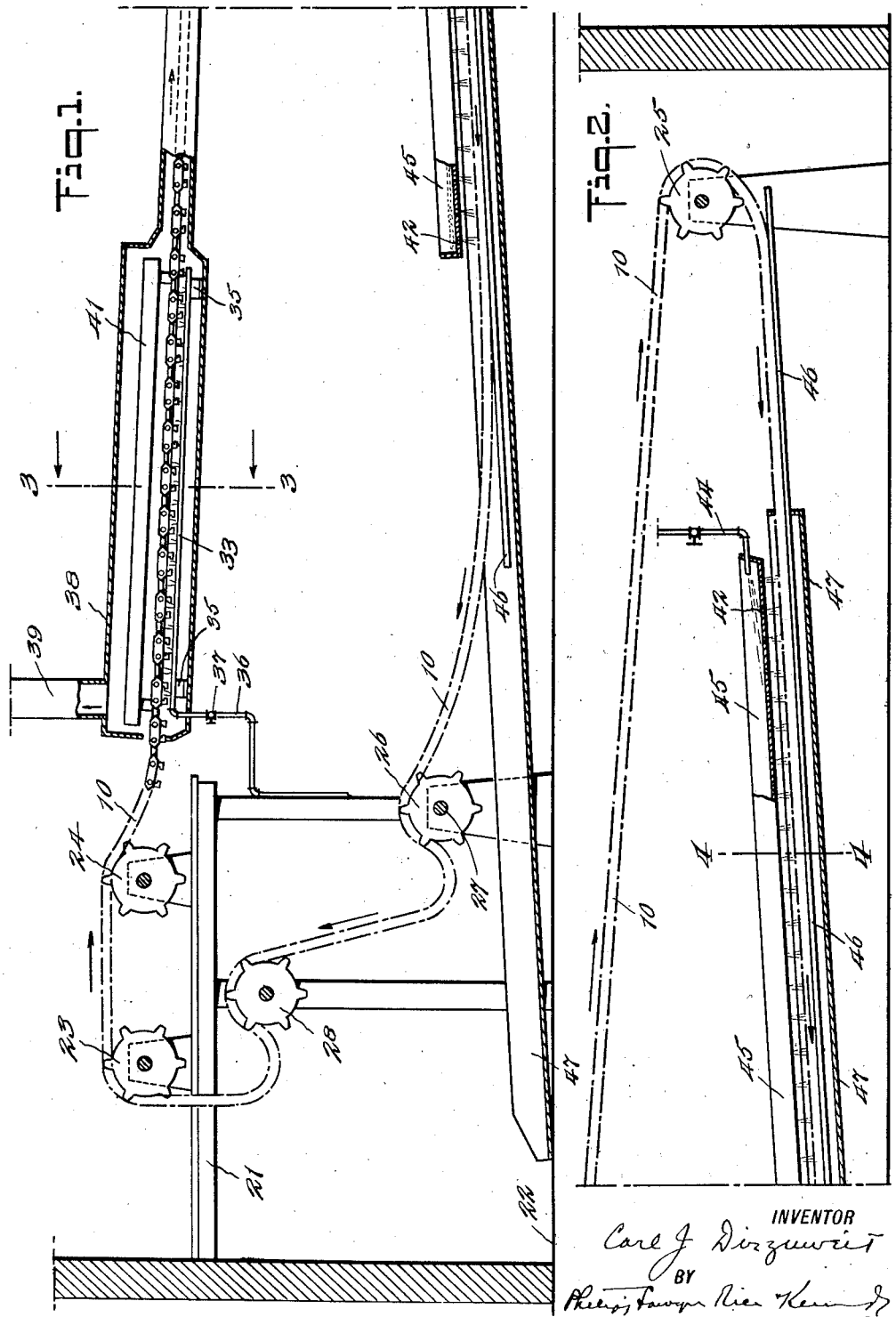

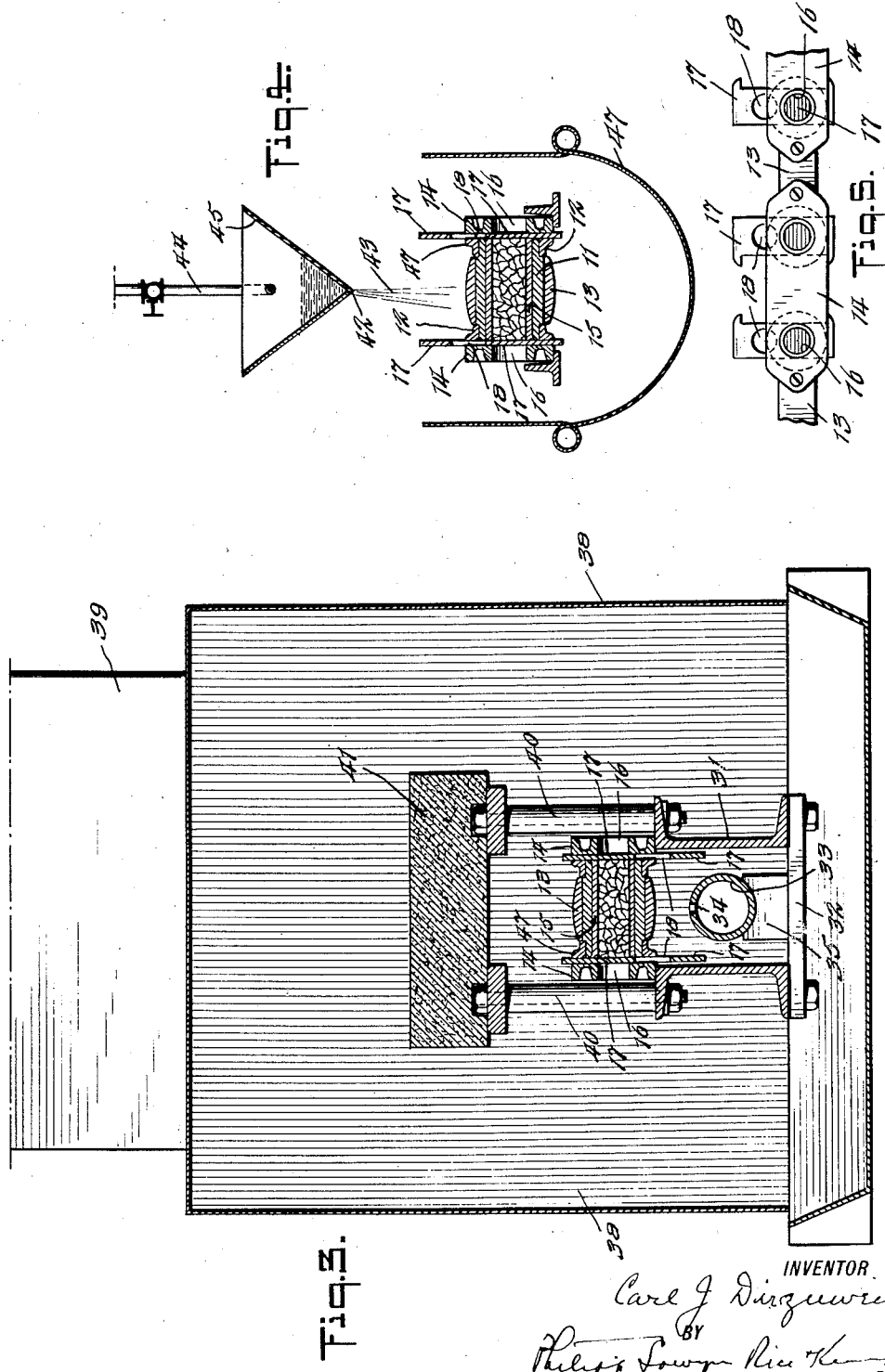

1,673,904

UNITED STATES PATENT OFFICE.

CARL J. DIRZUWEIT, OF BALTIMORE, MARYLAND, ASSIGNOR, BY MESNE ASSIGNMENTS, TO CROWN CORK & SEAL COMPANY, INC., OF NEW YORK, N. Y., A CORPORATION OF NEW YORK.

APPARATUS FOR PRODUCING ARTICLES OF COMPACTED GRANULAR MATERIAL.

Application filed July 1, 1925. Serial No. 40,828.

This invention relates to apparatus for producing articles of compacted granular material and particularly composition cork sticks.

In bottle caps of the well known crown cork type a metal shell or crown carries a cork sealing disk. A large number of these disks are made of so-called composition cork. Such disks are ordinarily made by mixing cork granules with a suitable binder, compressing and treating the material to form a stick, and slicing the stick into sealing disks for the crown shells.

An apparatus for forming such cork sticks is disclosed in a patent to George Goebel, No. 1,627,601 filed August 18, 1922. Briefly described, that apparatus takes a measured quantity of granular cork mixed with a suitable binder, compresses the charge along its length to give it desired diameter, compresses it endwise to give it the desired length, and confines the compressed charge in a carrier mold. The mold has end shutters that are freely slidable and are held closed by the expansive tendency of the compressed charge. The charges are subjected to a heat treatment to cause thorough permeation of the cork particles by the binder and a cooling treatment to set the sticks. This is accomplished by transporting the molds, which are carried by an endless conveyor chain, through a tank of hot water and a tank of cold water.

The present invention relates more particularly to the manner of carrying out the heat treatment and cooling treatment. It is the principal object of the invention to provide apparatus of the type mentioned that makes possible the production of improved composition cork sticks with a substantial saving of material.

With this general object in view, the invention consists in the features, combinations, details of construction, and arrangements of parts which will first be described in connection with the accompanying drawings and then more particularly pointed out.

In the drawings:

Figure 1 is a view partly in vertical section and partly diagrammatic showing one end of an apparatus constructed in accordance with the invention;

Figure 2 is a similar view showing the other end of the apparatus;

Figure 3 is an enlarged sectional view taken on the line 3—3 of Fig. 1, looking in the direction of the arrow;

Figure 4 is a similar view taken on the line 4—4 of Fig. 2; and,

Figure 5 is a detail view showing part of the conveyor chain in longitudinal section.

Referring to the drawings, there is provided a plurality of carrier molds for receiving compacted charges and means for transporting the molds. While these features may vary in construction, in structures embodying the invention to what is now considered the best advantage, the molds will be closed by freely slidable shutters and carried by an endless conveyor in the form of a chain. Although capable of various constructions, in that here shown as an example, the molds are carried by a chain 10. Each link of this chain comprises two cylinders 11 mounted in plates 12. Each cylinder 11 of a given link is connected to the adjacent cylinder of the next link by means of a double-eye coupling 13, the eyes of which embrace the cylinders to pivot thereon. Secured to each plate 12 but spaced therefrom is a side plate 14. Embraced within each cylinder 11 is a tubular, open-ended carrier mold 15, having the length and diameter of the article to be formed. In the apparatus illustrated this is a cylindrical stick. As will be apparent from Fig. 4, the side plates 14 have openings 16 in alinement with the ends of the molds. Freely slidable between the plates 12 and side plates 14, for each mold, is a pair of shutters 17 having off center openings 18 which are brought into and out of registry with the ends of the molds by movement of the shutters. In the drawings the shutters are shown closed, that is, with the openings out of registry with the molds. In this position, the shutters serve as end closures for the molds to confine the charge therein. The shutters, in the present embodiment, are held closed by the expansive tendency of the confined charge. They may be opened for the ejection of a treated charge and the reception of a new charge and closed to confine the charge in any suitable manner, for example, as described in the Goebel patent referred to.

While the conveyor chain 10 may be moved in various ways, and through various paths, in structures embodying the invention to what is now considered the best advantage the chain will have a path extending from the loading station downwardly on a long slant to a guide sprocket, back in a reverse direction on a long downward slant and then upwardly to the loading station. Moreover, in such constructions, the chain at the loading station will have a step-by-step movement and elsewhere in its path will be given a continuous driving movement, a suitable slack in the chain serving to compensate for this differential movement. In the embodiment here illustrated as an example, on a platform 21 elevated from the floor 22 are mounted two spaced sprockets 23, 24, over which the chain passes in the direction of the arrow (Fig. 1). These sprockets are given a simultaneous step-by-step movement in any suitable manner, for example by the mechanism disclosed in the Goebel patent above referred to. These sprockets may be termed loading-station sprockets. While no loading or unloading elements are shown, it is to be understood that these sprockets correspond to the sprockets 135 and 136 of the Goebel patent. As shown and described in that patent, while the molds are passing between the loading-station sprockets the treated charges are ejected and new charges loaded into the molds. When, therefore, a mold leaves the out-feed sprocket 24 it contains a compressed charge which is confined by the closed shutters (Fig. 3), the shutters being held closed as described in the Goebel patent.

Located at a distance from the loading station and in a plane between the platform and the floor is an idler guide sprocket 25 which guides the chain into a return direction. From this guide sprocket the chain passes to a drive sprocket 26 mounted on a shaft 27 which is given a continuous rotation in any suitable manner. This drive sprocket is located near the floor and substantially below the out-feed sprocket 24. From the drive sprocket 26 the chain passes, with a substantial slack (Fig. 1) to a guide sprocket 28 and from there with further slack to the in-feed sprocket 23. As will be seen from the drawings, the path of the chain takes two long downward slants: one from the loading station to the distant sprocket 25; the other from the distant sprocket toward the drive sprocket 26. The differential movement between the step-by-step drive of loading-station sprockets 23, 24 and the continuous drive of sprocket 26 is compensated for by the slack of the chain.

The invention in its entirety includes means for subjecting the confined charges to the action of a dry heating medium. This may be accomplished conveniently by means of a multiple-jet burner for establishing a flame and hot air zone through which the molds are carried. Although capable of various constructions, in that here shown as an example, a short distance beyond the out-feed sprocket 24, the chain side plates ride on supporting and positioning tracks formed by a pair of spaced channel bars 31. These bars are mounted on a beam 32 supported in any suitable manner. Between the channel bars and below the central line of the path of the chain is a burner in the form of a gas pipe 33 having a series of gas ports 34 spaced along its length. The pipe is supported from beam 32 by blocks 35. A supply pipe 36 having a gas-control valve 37, of any suitable description, leads from a source of gas, for example, the ordinary commerical gas main. In the embodiment shown, a heating chamber is provided by a housing 38 having a stack 39. Above the path of the chain and supported by posts 40 from channel bars 31 is a baffle 41. The baffle is substantially co-extensive with the burner pipe 33, the housing having an extension beyond the burner, which is, in cross section, somewhat smaller in size than the main housing, as appears in Fig. 1.

When the burner jets are ignited there is provided a dry heating medium for the charges. As the chain moves along the track in the heating chamber the mold units pass through the flame and hot air zone and are heated thereby. The heat absorbed by the metal of the mold and conveyor parts is conducted to the confined charges and this heat treatment serves to cause the binder to permeate thoroughly the cork particles. During the passage of the chain through the flame zone the metal of the chain and mold parts stores a considerable amount of heat so that the heat treatment of a given charge continues a substantial length of time after that particular mold unit leaves the flame zone.

It has been found that the best results are obtained when the charges have a given amount of heat treatment. With the construction described the heat treatment varies with and can be controlled by the length of the burner pipe, the speed of the conveyor, and the degree of heat supplied to the burner. As the speed of the chain is more or less controlled by the requirements of the compressing and loading mechanisms, the heat treatment is best controlled by the length of the burner pipe. The degree of heat per jet depends in part on the source of fuel but adjustment can be made by means of valve 37. In the embodiment illustrated, the charges are composition cork sticks an inch in diameter and 3" long and the chain is driven at a speed to discharge and load 30 molds per minute. The fuel used is ordinary commercial illuminating gas. The burner pipe has a length such that a given mold takes approximately two minutes in passing through the flame zone, i. e., over the burner pipe. The distant guide sprocket is located at such a distance that the heat treatment by absorption after a given mold leaves the flame zone can continue for approximately eight minutes before the cooling treatment, to be described, begins.

The invention, in its entirety, includes means for subjecting the heat-treated charges to the action of a cooling medium and in structures embodying the invention to what is now considered the best advantage, this will be accomplished by directing onto the mold units a series of water jets or sprays. Although capable of various constructions in that here shown as an example, located above a portion of the path of the chain on its return journey from distant sprocket 25 is a V-shaped water trough 45 supported in any suitable manner with its apex over the central line of the path of the chain and having a downward slant corresponding with the slant of the chain. In the bottom of this trough are a plurality of spaced discharge ports 42 for directing water jets or sprays 43 onto the mold units. Water is supplied by a pipe 44 located at the upper end of the trough and connected with any suitable source of supply of cold water, the water running down the trough to the several jet ports. Below the chain is a collecting gutter 47 for the waste water which flows down the same, to be carried away as may be desired. The chain is supported and positioned on its travel under the water jets by a trackway indicated diagrammatically at 46. This may be of any suitable construction to receive the end plates 14.

As a mold unit passes beneath the several water jets, the mold units and consequently the heat-treated charges, are cooled by the action of the cold water, whereby the charge is set. Each water jet is comparatively small and is directed toward the center of the mold units. As appears in Fig. 4, the plates 12 have upturned flanges 47 which tend to confine the water near the center and prevent it from reaching the ends of the unit. As a result, substantially no water reaches the charges confined in the molds.

With the construction described there is substantially no chance that the charges will become wet or damp. The heat treatment is by a dry heating medium and the cooling treatment is carried out in such a manner that substantially no water penetrates to the charges. Consequently the freely slidable shutters of the mold units need not be held water tight. As the holding force on the shutters is the expansive tendency of the confined charge, the necessary expansive tendency is considerably less than if the shutters had to be held water-tight. Therefore, with the constructions described the amount of material to be compressed into a given charge may be reduced accordingly. As a result there is a very substantial saving in material for a given number of sticks and, moreover, the sticks produced, by reason of the reduction of compressed material per unit of volume, make better sealing disks. A further advantage of the construction described is that the conveyor chain is easily handled because of the two long downward slants and the cooling water is distributed and the waste water collected by gravity flow.

The operation of the apparatus will be clear from the above without further description.

What I claim is:

1. In apparatus of the class described, and in combination, a carrier mold for receiving a charge of material, a housing, a multiple-jet burner located in the housing, a baffle above the burner, and means for moving the carrier mold through a path between the burner and the baffle.

2. In apparatus of the class described, and in combination, a plurality of carrier molds for receiving charges of material, an endless conveyor by which said molds are carried, means for moving the conveyor, sprockets over which the conveyor travels and arranged to give part of the path of the conveyor a downward slant, a V-shaped trough located over the slanting conveyor and similarly slanted, and having a row of jet openings, and a pipe associated with the upper end of the trough for supplying water thereto.

3. In apparatus of the class described, and in combination, a plurality of carrier molds, an endless conveyor by which said molds are carried, a loading-station sprocket for the conveyor, another sprocket located below the first sprocket, a distant guide sprocket for directing the conveyor on its return journey, said distant sprocket being located in a plane below that of the first sprocket and above that of the second sprocket, whereby the conveyor has a downward slant on its out travel and a downward slant on part of its return travel, means associated with part of the path of the conveyor for supplying a heating medium, and means associated with another part of the path of the conveyor for supplying a cooling medium.

4. In apparatus of the class described, and in combination, a plurality of carrier molds, an endless conveyor by which said molds are carried, two spaced loading-station sprockets over which said conveyor passes and arranged for a step-by-step rotation, a distant idler guide sprocket for directing the conveyor into a return path and located in a plane below that of the loading-station sprockets, whereby the conveyor has a downward slant on its outward journey, a sprocket over which the conveyor passes and located in a plane below that of the distant sprocket, whereby the conveyor has a downward slant on its return journey, a shaft for driving the third named sprocket with continuous rotation, the conveyor having a slack between said driven sprocket and the loading-station sprockets to compensate for the differential sprocket movement, and means for subjecting the molds during their travel to the successive actions of a heating medium and a cooling medium.

5. In apparatus of the class described, and in combination, a plurality of carrier molds for receiving charges of granular cork mixed with a binder, freely slidable shutters for closing the ends of the molds and adapted to be held closed by the expansive tendency of the charge, an endless conveyor for carrying said molds, means adjacent part of the path of the conveyor for subjecting the molds to the heating action of a plurality of flame jets, and means adjacent a further portion of the path of the conveyor for subjecting the molds to the cooling action of a plurality of water jets.

In testimony whereof, I have hereunto set my hand.

CARL J. DIRZUWEIT